May 30, 1944.  W. H. BRADY  2,350,012
ELECTRICAL ROTOR CORE
Filed May 13, 1942

Inventor
William H. Brady

Witness:
John H. Cave

By John F. Hine
Attorney

Patented May 30, 1944

2,350,012

UNITED STATES PATENT OFFICE 2,350,012

ELECTRICAL ROTOR CORE

William H. Brady, Roselle, N. J., assignor to The Singer Manufacturing Company, Elizabeth, N. J., a corporation of New Jersey Application May 13, 1942, Serial No. 442,735

7 Claims. (Cl. 172—120)

This invention relates to electrical motors of the alternating current induction type and particularly to magnetic rotor cores for such motors and to the laminations which said cores comprise.

More particularly, this invention is concerned with magnetic rotor cores made from stacked laminations having slots of composite shape adapted to receive conductors made either of copper or of aluminum alloys to form rotors which for practical purposes are mechanically and electrically interchangeable.

It is customary in the manufacture of induction motors to employ separately designed rotor punchings or laminations for copper and for aluminum squirrel-cage windings. The term "equivalent rotors" will be used in this specification to refer to rotors, whether having copper or aluminum conductors, which may be interchangeably used with the same stator to produce substantially the same mechanical and electrical performance. The important criterion for substantial equivalence of rotor performance when used in the same stator is that the resistance of the rotor winding be made substantially the same with either aluminum or copper conductors. It is evident, then, that the lower conductivity of aluminum relative to copper demands for it a larger sectional area than for copper. Rotor slots for receiving copper conductors are generally circular in shape to most efficiently accommodate the usually available round copper bars. Rotor slots for receiving aluminum conductors in an equivalent rotor would generally have slots formed with sufficient radial depth to secure the additional area desired without decreasing the tooth width. That is to say, two separate lamination slot shapes have been considered necessary to make equivalent rotors, depending on whether copper or aluminum conductors are employed. Heretofore, this has been satisfied by two separate types of lamination requiring two separate punching dies. Unfortunately this arrangement, besides showing a high die cost, is inflexible in the sense that the choice of the particular lamination fixes immediately the conductor material to be used therewith in making rotors. It is clear that a die for making laminations for rotors employing die-cast aluminum conductors becomes of little use in the event aluminum cannot be obtained. The laminations themselves would also be of little use. In view of the uncertain conditions of scarcity of materials existing today, this non-flexible arrangement represents a real problem.

It is customary in electric motor manufacture to employ dies which have a useful life of several millions of laminations. Such dies are costly, and can be economically employed only if use is made of all the laminations they are capable of punching out. Let us suppose, for example, that a motor manufacturer is faced with the problem of ordering a new lamination die, the old one having worn out. He has found that die-cast aluminum rotors can be made at a lower production cost than copper conductor rotors and has, therefore, been using the die-cast method exclusively. However, due to shortages, he can no longer secure aluminum but can get copper. The new die will obviously be designed to accommodate copper conductors but no one can foretell when aluminum will again become available for rotor conductors. It is possible that this may occur shortly after the new die is built in which case the manufacturer is faced with the alternatives of continuing to make the higher cost copper conductor rotors or of scrapping his new die. In either case, he takes a loss which could be avoided if means were provided to adapt the laminations punched out by the new die for receiving either aluminum or copper conductors to form therefrom equivalent rotors.

I have, therefore, provided a core having a composite slot which has a shape and proportions adapted to receive either an aluminum conductor cast within and entirely filling said slot or a preformed copper bar inserted within and substantially filling a definite portion of said slot, due consideration being taken of the relative areas involved to secure substantially the same resistance per unit length with either conductor material.

The above description has been limited to considerations of copper and aluminum as the alternative conductor materials. This invention is not to be considered as so limited but includes within its scope laminations and cores adapted for interchangeable operation using any two alternative conductor materials of different conductivity.

With the above and other objects in view as will hereinafter appear, the invention comprises the combinations and arrangement of parts hereinafter set forth and illustrated in the accompanying drawing of certain specific embodiments of the invention, from which the several features of the invention and the advantages attained thereby will be readily understood by those skilled in the art.

In the accompanying drawing—

Figure 1:
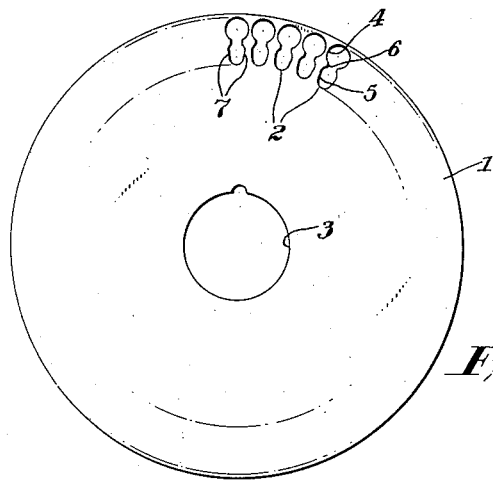
Fig. 1 is a front elevational view showing a rotor lamination embodying the invention.
Figure 4:
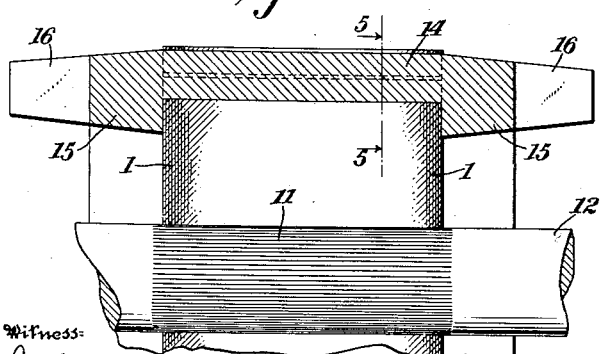

Fig 4. is a longitudinal sectional view showing a second rotor employing the lamination of Fig. 1.

Figure 5:
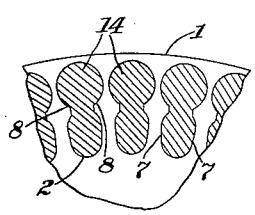

Fig. 5 is an enlarged transverse sectional view taken on the line 5—5 of Fig. 4.

Referring to the drawing, I have shown in

Fig. 1 an improved lamination for an induction motor rotor embodying the invention. This lamination comprises a thin circular disc 1 of magnetic material formed with radial slots 2 equidistantly spaced around the peripheral portion and adapted to form conductor-receiving openings or channels when said discs are stacked together in face-to-face relation to form a rotor core. Although but a few slots are actually shown in the lamination of Fig. 1, it is understood that said slots extend continuously in spaced relation around the peripheral portion of the lamination. A central portion of the lamination is provided with an aperture 3 for receiving a shaft upon which said laminations are secured for rotation within the usual stator structure (not shown). The slots 2 are each formed with three distinct portions, viz., an outer portion 4, an inner portion 5, and an intermediate neck portion 6 connecting said outer and inner portions. Preferably but not necessarily, the outer portion 4 of the slot has a circular shape in order to receive a copper conductor of circular cross-section which represents the most commonly available shape. The inner portion 5 is generally trapezoidal in shape expanding toward the periphery of the lamination with substantially radial sides 7 and effects an addition to the total slot area without decreasing the tooth width between the sides 7 and without raising the magnetic density in the tooth above a permissible value. This inner slot portion 5, then becomes substantially shovel or spade shaped, being rounded toward the central aperture 3. The intermediate slot portion 6 provides a short radial connecting space formed by slight inward displacement of the side-portions. As will be pointed out in greater detail later, this connecting space is narrowed only sufficiently to provide inwardly extending lip portions 8 on either side of the slot to prevent axial inward displacement of a circular conductor positioned in the outer portion of the slot. A closed slot has been described herein but it is clear that this invention applies with equal effect to an open slot which has the outer portion radially open to the exterior of the lamination.

It will be understood that the slot according to the invention is not to be confused with the so-called double-cage rotor slot which has a somewhat similar shape but which is characterized by having a very narrow intermediate portion of considerable radial length. In fact, in the latter case, this intermediate portion is purposely made narrow and radially long to provide an easy path for the magnetic flux to pass between the outer and inner portions of the slot to control the relative reactance of the two slot portions and thus influence the electrical operating characteristics of the rotor in which a lamination containing such slots might be used. This reactance control effect is not desirable with the present composite slot and, accordingly, the intermediate portion is made wide and short rather than narrow and long.

Figure 2:
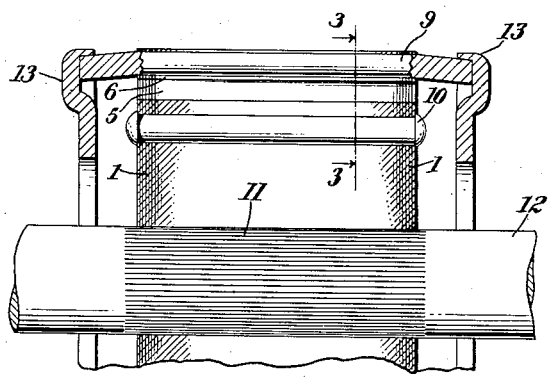
Fig. 2 is a longitudinal sectional view showing a rotor employing the lamination of Fig. 1.
Figure 3:
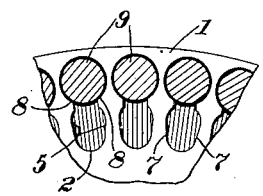
Fig. 3 is an enlarged transverse sectional view taken on the line 3—3 of Fig. 2.

A unique criterion of slot shape in this case is that the areas of the various slot portions bear a substantially definite relationship to the conductivities of the conductor materials alternatively employed in said slot portions. If, for example, copper is to be used as a conductor material, the outer portion of the slot only is filled with a copper conductor 9 as shown in Figs. 2 and 3. A rotor employing copper conductors comprises laminations 1 stacked together and held preferably by longitudinal rivets 10 to form a magnetic core which is held onto a straight knurled portion 11 of a shaft 12 by a press fit. The copper conductors occupying the slots 2, are bent radially inwardly at the core ends and are provided with annular end rings 13 to which they are secured by brazing, soldering or any other suitable means to form a squirrel-cage winding. The intermediate and inner slot portions, 6 and 5 respectively, are unoccupied as shown in Fig. 3. In those cases where the end-rings 13 are positioned closely against the end laminations of the core the rivets 10 are dispensed with, the core being held together by the cage itself.

The equivalent aluminum cage rotor, shown in Figs. 4 and 5, comprises laminations 1 stacked together to form a magnetic core having the slots 2 therein aligned to present longitudinal conductor-receiving channels completely filled with die-cast aluminum alloy conductors 14 and having connecting end-ring portions 15 and fan-blade portions 16 cast integrally with the conductors 14.

It will be understood from the foregoing description that the ratio of the various slot portion areas is determined essentially by the relative conductivity of the conductor materials which it is desired to employ interchangeably in equivalent rotors. As an example, I have made a lamination according to this invention containing slots adapted to employ alternatively either ordinary copper bars or ordinary die-cast aluminum alloy conductors. The aluminum alloy, as cast, has a conductivity of about 41% of that of copper. The approximate slot dimensions for this design are as follows:

Total slot area = .0377 sq. in.
Area of outer portion = .0201 sq. in.
Area of outer portion = 53.3% of total area.
Diameter of outer portion = .16 in.
Width at intermediate portion = .10 in.
Width at intermediate portion = 62.5% of diameter of outer portion.
Radial length of intermediate portion = .045 in.

This slot is designed to receive a No. 7 round copper conductor having a cross sectional area of about .0163 square inch which is approximately 43% of the total slot area. It is evident that, with inserted conductor bars, the effective conductor area is somewhat less than the actual area of the slot opening occupied due to clearance required for insertion. Thus, in the slot shape according to this invention, the area of the outer portion of the slot is at least equal to that percentage of the total slot area represented by the percentage electrical conductivity of the conductor material of lower conductivity relative to that of higher conductivity.

The inwardly extending lip portions 8 provided intermediate the ends of the slots have two important functions. First, they provide mechanical support for the conductors located in the outer portions of the slot and reduce the possible lateral movement of said conductors relative to the core to a minimum. This facilitates the assembly of the rotor when using bar conductors by maintaining a sufficiently accurate symmetrical and rigid positioning of said conductors within the slots to make special jigs and fixtures unnecessary. Further, the resultant squirrel-cage structure is intimately and securely held by the core body to withstand any distortion or displacement of said cage due to centrifugal forces.

Secondly, the inwardly extending lip portions provide an electrical advantage by increasing somewhat the circumferential extent of the boundary between the conductor bar and the core material. In this way the electrical effect of the unoccupied inner slot portion on the conductor in the outer slot portion is partially compensated and the characteristics of the partially-filled-slot rotor may be made to follow more closely those of the completely-filled-slot rotor. That is to say, better equivalent performance results from this construction.

It will be perceived from the above description that I have provided laminations for making induction-motor rotor cores which, due to the shape and proportions of the conductor-receiving slots, may be used to build equivalent rotors employing alternatively either of two conductor materials of different conductivities.

It will be obvious to those skilled in the art that the invention may, without departure from its essential attributes, be embodied in various specific forms other than those shown and described, which latter are to be considered in all respects as illustrative of the invention and not restrictive; reference being had to the appended claims rather than to the foregoing description to indicate the scope of the invention.

Having thus set forth the nature of the invention what I claim herein is:

1. An induction motor rotor core having magnetic laminations formed with conductor-receiving slots located adjacent the outer peripheral portion of said laminations, said slots each having an outer portion and an inner portion, an intermediate neck portion joining said outer and inner portions, said outer portion having an area so related to the total area of the slot that a preformed copper conductor substantially filling the outer portion will have substantially the same electrical resistance per unit length as a cast aluminum conductor filling the entire slot.

2. An induction motor rotor core, for making equivalent rotors employing different conductor materials, having magnetic laminations formed with conductor-receiving slots located adjacent the outer peripheral portions of said laminations, said slots each having the opposed side walls thereof provided intermediate the ends of the slot with inwardly extending lips defining an outer and an inner slot portion, said outer slot portion defining a space adapted to be substantially filled with a given conductor material, said entire slot defining a space adapted to be filled alternatively with another conductor material of lower electrical conductivity than said given conductor material, the ratio of the area of the outer portion of the slot to the area of the entire slot being such that the electrical resistance per slot is approximately the same with either conductor material.

3. An induction motor rotor core for making equivalent rotors employing alternative conductor materials having laminations of magnetic material formed with radial conductor-receiving openings located adjacent the outer peripheral portion of said laminations, said openings each expanding toward the peripheral portion with substantially radial sides and terminating at the outer end in a circular portion which defines a space adapted to be substantially filled with a given conductor material, said entire opening defining a space adapted to be substantially filled alternatively with another conductor material of lower conductivity than said given conductor material, the ratio of the area of the circular portion to the area of the entire opening being such that the electrical resistance per slot is approximately the same with either conductor material.

4. An induction motor rotor core comprising laminations of magnetic material formed with radial conductor-receiving openings located adjacent the outer peripheral portion of said laminations, said openings each having a circular outer portion, a trapezoidal inner portion, and an intermediate connecting portion narrower than the diameter of said outer circular portion, said circular portion having an area so related to the total area of the conductor-receiving opening that a preformed copper conductor substantially filling the circular portion will have approximately the same electrical resistance per unit length as a cast aluminum conductor filling the entire opening.

5. An induction motor rotor core for making equivalent rotors employing alternative conductor materials comprising laminations of magnetic material formed with radial conductor-receiving slots having rounded ends and located adjacent the outer peripheral portions of said laminations, said slots each having the opposed side walls thereof provided intermediate the rounded ends thereof with inwardly extending lips defining an outer circular slot portion and an inner trapezoidal slot portion, said outer slot portion defining a space adapted to be substantially filled with a given conductor material, said entire slot defining a space adapted to be filled alternatively with another conductor material of lower electrical conductivity than said given conductor material, the ratio of the area of the outer portion of the slot to the area of the entire slot being such that the electrical resistance per slot is approximately the same with either conductor material.

6. A lamination for making induction motor rotor cores comprising a thin disc of magnetic material formed with radial conductor-receiving openings spaced equidistantly around the peripheral edge portion of said disc, said conductor-receiving openings each having substantially radial side walls presenting a space expanding toward the outer edge of the disc and terminating in a circular end portion adapted to be substantially filled with a given conductor of circular cross-section, the entire opening being adapted to be alternatively filled with another conductor, the areas of the circular portion of and of the entire opening being so proportioned that either of said conductors may be used to produce a rotor of a given electrical resistance.

7. An induction motor rotor core for making equivalent rotors employing different conductor materials, having magnetic laminations formed with conductor-receiving slots located adjacent the outer peripheral portion of said laminations, said slots each having an outer portion, an inner portion, and an intermediate neck portion joining said outer and inner portions, said outer slot portion defining a space adapted to be substantially filled with a first conductor material, said entire slot defining a space adapted to be filled alternatively with a second conductor material of lower electrical conductivity than said given conductor material, said outer portion having an area so related to the total area of the slot that the first conductor material substantially filling the outer portion will have substantially the same electrical resistance per unit length as the second conductor material filling the entire slot.

WILLIAM H. BRADY.